United States Patent [19]
Phillips

[11] Patent Number: 5,064,451
[45] Date of Patent: Nov. 12, 1991

[54] HAMPER AIR PURIFICATION SYSTEM

[75] Inventor: Alan J. Phillips, Santa Monica, Calif.

[73] Assignee: Air Quality Laboratories, Santa Monica, Calif.

[21] Appl. No.: 562,211

[22] Filed: Jul. 31, 1990

[51] Int. Cl.$^5$ .............................................. B01D 53/00
[52] U.S. Cl. ............................................ 55/74; 55/97; 55/357; 55/385.4; 55/387; 55/467
[58] Field of Search ................ 55/74, 357, 385.4, 467, 55/387, 97

[56]  References Cited
U.S. PATENT DOCUMENTS

| | | | |
|---|---|---|---|
| 1,774,156 | 8/1930 | Root | 55/467 |
| 1,819,521 | 8/1931 | Root | 55/467 |
| 1,984,513 | 12/1934 | Angelus et al. | 68/209 |
| 2,871,975 | 2/1959 | Polo | 55/357 |
| 3,768,232 | 10/1973 | Farber et al. | 55/208 |
| 3,883,325 | 5/1975 | Fuhring et al. | 55/74 |
| 3,971,644 | 7/1976 | Sugarmann | 55/387 |
| 4,163,650 | 8/1979 | Watson et al. | 55/467 |
| 4,175,932 | 11/1979 | Durr | 55/59 |
| 4,217,115 | 8/1980 | Palmer | 55/89 |
| 4,397,663 | 8/1983 | Michlin et al. | 55/387 |
| 4,512,245 | 4/1985 | Goldman | 98/115.4 |
| 4,606,260 | 8/1986 | Cox | 98/115.3 |
| 4,898,601 | 2/1990 | Casey | 55/74 |
| 4,906,261 | 3/1990 | Mohajer | 55/467 |

Primary Examiner—Jay H. Woo
Assistant Examiner—C. Scott Bushey
Attorney, Agent, or Firm—Poms, Smith, Lande & Rose

[57]  ABSTRACT

A portable air purification system for removing perchloroethylene and other noxious vapors from dry cleaning hampers. The system includes a nozzle which is connected via a hose to a blower unit. The nozzle includes a filter which removes the noxious vapors from air as it is drawn into the system. The system removes residual dry cleaning vapors from clothes which are placed in the hamper or temporary storage after being dry cleaned.

11 Claims, 1 Drawing Sheet

5,064,451

HAMPER AIR PURIFICATION SYSTEM

BACKGROUND OF THE INVENTION

1. Field of the Invention

The present invention relates generally to preventing the escape of noxious vapors during the dry cleaning of clothes and other fabrics. More particularly, the present invention involves a system for preventing the escape of residual dry cleaning fluid vapors from clothes when they are stored in a hamper immediately following dry cleaning.

2. Description of Related Art

Perchloroethylene (tetrachloroethylene) is a chlorinated hydrocarbon solvent which is commonly used in the dry cleaning of clothes and other fabrics. Perchloroethylene has a high molecular ratio of chlorine to carbon, making it non-flammable and non-explosive. It rapidly dissolves vegetable, animal, and mineral oils, greases, tars and resins. Accordingly, perchloroethylene has been considered an ideal solvent for dry cleaning and has been used in such processes since 1934.

Recent environmental concerns have made it essential that perchloroethylene not be allowed to escape from the dry cleaning facilities. Further, it is important that the exposure of employees to perchloroethylene within the facility also be minimized.

During the dry cleaning process, the clothes are situated with perchloroethylene within the dry cleaning apparatus. Upon completion of the cleaning process, substantially all of the perchloroethylene is removed from the clothes. However, when the clothes are removed from the dry cleaning machine, they still contain a residual amount of perchloroethylene. Typically, the clothes are placed within a hamper for short term storage prior to folding or further processing. The residual vapors of perchloroethylene remaining in the clothes when they are placed in the hamper is a potential source of undesirable noxious fumes. These fumes can escape into the cleaning facility and subsequently be dispersed into the environment. In addition, the escaping fumes may adversely affect the personnel operating the equipment over extended periods of time.

In view of the above considerations, it would be desirable to provide a system for preventing the escape of the perchloroethylene and any other noxious vapors from the dry cleaning hamper during the storage of clothes therein.

SUMMARY OF THE INVENTION

In accordance with the present invention, a portable air purification system is provided for removing noxious vapors from a dry cleaning hamper. The air purification system is portable and may be removably attached to different hampers as they are loaded and unloaded.

The portable air purification system in accordance with the present invention includes a nozzle for receiving the perchloroethylene or other noxious vapors which are present in the clothes as they are temporarily stored in the dry cleaning hamper. The nozzle includes an inlet, an outlet and a filter located therebetween for entrapping the noxious vapors. As a result, purified air exits the nozzle outlet. A hose having an inlet is connected to the nozzle outlet. The other end or outlet of the hose is connected to a blower unit through which the purified air is drawn and exhausted.

The portable air purification system in accordance with the present invention provides a number of advantages for insuring that residual amounts of perchloroethylene do not evaporate or otherwise escape from clothes during temporary storage immediately after the dry cleaning process. The portability of the system allows it to be transferred from hamper to hamper so that a single system may be used to service an unlimited number of hampers.

Other features and attendant advantages of the present invention will become better understood by reference to the detailed description when taken in conjunction with the accompanying drawings.

DETAILED DESCRIPTION OF THE DRAWINGS

DETAILED DESCRIPTION OF THE INVENTION

Figure 1:
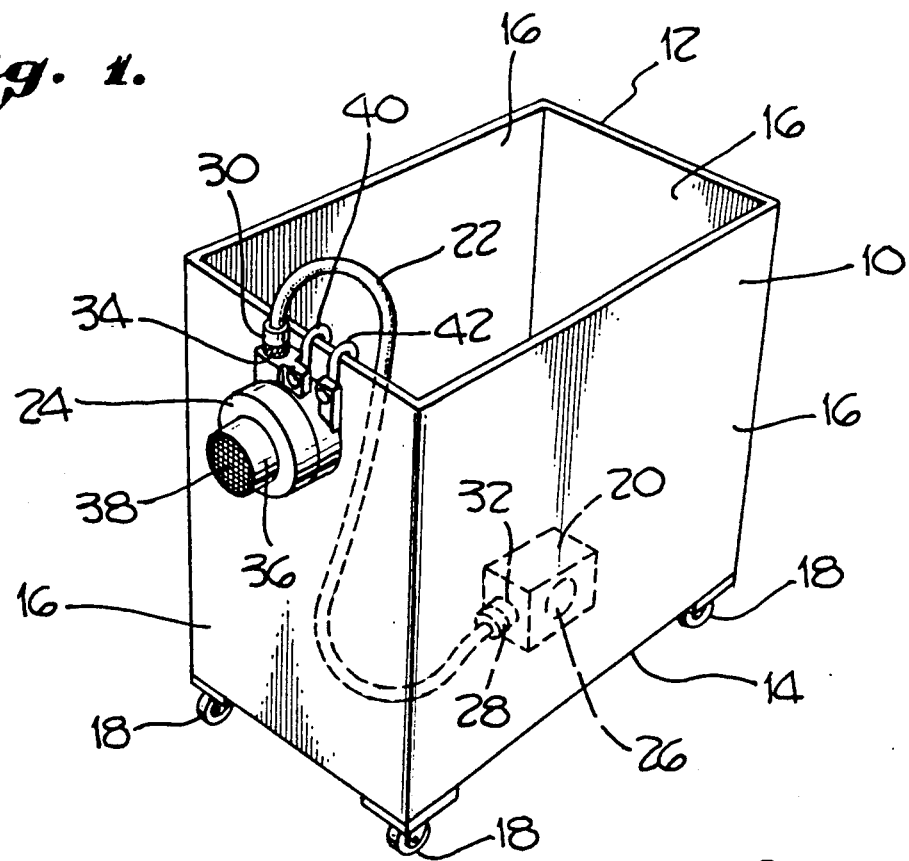
FIG. 1 shows a preferred exemplary portable mounted in place on a clothes hamper.
Figure 2:
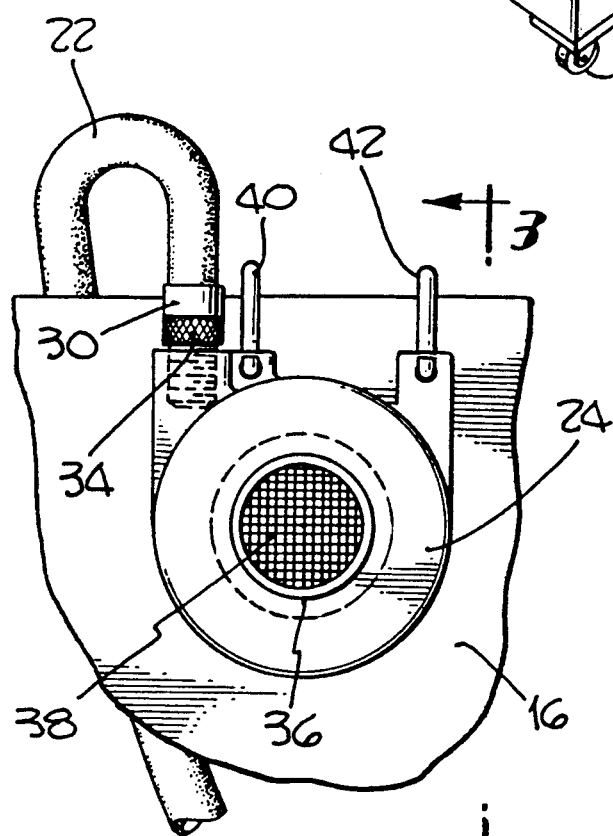
FIG. 2 is a side view of the blower unit shown in FIG. 1.
Figure 3:
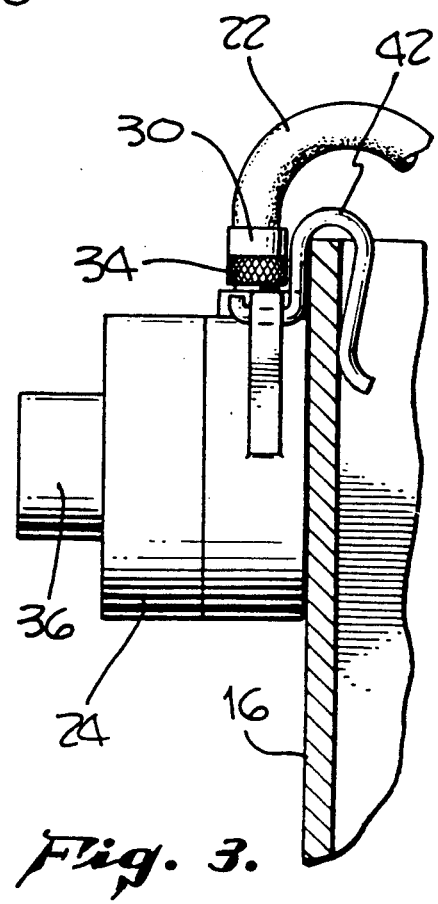
FIG. 3 is a sectional view of FIG. 2 taken in the 3—3 plane.

A preferred exemplary embodiment of the present invention is shown in FIG. 1 mounted onto a hamper 10. The hamper 10 includes a top rail perimeter 12, a bottom 14 and sides 16 extending therebetween. The hamper 10 preferably includes casters or rollers 18.

The preferred exemplary portable air purification system in accordance with the present invention includes a nozzle 20, hose 22 and blower unit 24. The nozzle 20 includes an inlet 26 which may be located on the side, top or bottom of the inlet. The inlet 20 is preferably screened to prevent clothes or other fabrics from being sucked into the air purification system. The inlet should be sized sufficiently to allow a rather large volume of air to be drawn into the system.

The nozzle 20 includes a filter which is designed to entrap and remove perchloroethylene and other noxious vapors. Activated charcoal filters are suitable as are any other conventional filter system which is designed to remove chlorinated hydrocarbons from air. Filter units which also can function as a nozzle are the filter cartridges used with respirators. These filter cartridges are relatively compact units having an inlet through which contaminated air is drawn and passed through a variety of filters. The filtered air is then exhausted through an outlet which is connected to the respirator body. Respirator filter cartridges are readily available commercially and therefore are particularly preferred for use as a combined nozzle/filter unit.

A flexible hose 22 is provided having an inlet 28 and an outlet 30. The inlet 28 is connected to the outlet 32 of nozzle 20. This connection is made by a threaded coupling or other conventional airtight coupling arrangement. The outlet 30 of hose 22 is connected to inlet 34 of the blower unit 24. The flexible hose 22 may be replaced with a rigid hose, if desired. However, a flexible hose is preferred to allow the portable unit to be used with a wide variety of hamper sizes. The hose should be between about 2 to 5 feet in length.

The blower unit 24 includes housing 36. The purified air from hose 22 is drawn into the blower unit 24 through inlet 34 and exhausted through outlet 38. The blower unit may be any of the conventional fan blowers which are typically used in vacuum or ventilation systems. The particular blower unit is not critical provided that it is capable of providing the necessary flow of air through the system. Blower units utilizing squirrel cage fans or fan blades are suitable. It is preferred however, that the blower unit be sufficiently small so that it can be transferred between clothes hampers relatively easily. Blower units powered by one-quarter horse power to three horse power motors are preferred. The blower unit should be sized according to the size of the hamper with the larger blower units being used with larger hamper sizes.

Means for removably mounting the blower unit 24 to the hamper is provided by S-shaped hooks 40 and 42. Although one hook may be used, it is preferred that two hooks be provided. The hooks are designed to allow the blower unit 24 to be quickly and easily mounted onto the outside of the hamper 10. Other types of releasable connectors may be utilized. For example, quick disconnect or other releasable attachment devices can be used in place of hooks 40 and 42. The hooks 40 and 42 are preferred since they are simple in design and allow the blower unit to be quickly removed from a particular hamper and transferred to another. The blower unit 24 is electrically operated and includes the necessary power cords and switches which are not shown.

During operation, clothes and other fabric or garments which have been dry cleaned are removed from the dry cleaning apparatus and placed into the hamper 10. The residual vapors present in the clothes are drawn downward toward nozzle 20. Nozzle 20 is preferably placed on the bottom 14 of the hamper 10 since perchloroethylene vapors are heavier than air and tend to settle toward the hamper bottom 14. The settling of the perchloroethylene vapors in combination with the suction provided by the blower unit 24 combine together to prevent vapors from exiting the top of the hamper 10. As the contaminated vapors enter inlet 26 of nozzle 20, they are passed through a filter to remove the noxious vapors. The purified air then travels through hose 22 and into the inlet of blower unit 24. The air is then exhausted through outlet 38 which is preferably covered with a screen 40 for safety. After the clothes have been removed from the hamper, the portable unit may be left in place for the next load or it may be transferred to another hamper.

Having thus described exemplary embodiments of the present invention, it should be understood by those skilled in the art the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A portable air purification apparatus for removing noxious vapors from a dry cleaning hamper, said apparatus comprising:
    a nozzle for receiving noxious vapors present in said dry cleaning hamper, said nozzle including an inlet proximately disposed to the bottom surface of said hamper, an outlet and a filter located therebetween for entrapping said noxious vapors wherein purified air exits said nozzle outlet,
    a hose having an inlet connected to said nozzle outlet and an outlet;
    a blower unit having a housing comprising an inlet connected to said hose outlet through which said purified air is drawn into said blower unit and an outlet through which said purified air is exhausted from said blower unit; and
    means for removably mounting said blower unit to said dry cleaning hamper.

2. A portable air purification apparatus according to claim 1 wherein said means for mounting said blower unit to said dry cleaning hamper includes at least one S-shaped hook having a fixed end attached to said blower unit; a free end displaced away from said blower unit and a mounting portion extending therebetween.

3. A portable air purification apparatus according to claim 1 wherein said hose is flexible.

4. A portable air purification apparatus according to claim 3 wherein the length of said hose is between about 2 to 5 feet.

5. A hamper air purification apparatus for removing noxious vapors from a dry cleaning hamper, said apparatus comprising:
    a hamper having a bottom, a top rail perimeter and sides extending between said top rail perimeter and said bottom;
    a nozzle for receiving noxious vapors present in said hamper, said nozzle including an inlet proximately disposed to said bottom of said hamper, an outlet and a filter located therebetween for entrapping said noxious vapors wherein purified air exits said nozzle outlet;
    a hose having an inlet connected to said nozzle outlet and an outlet;
    a blower unit having a housing comprising an inlet connected to said hose outlet through which said purified air is drawn into said blower unit and an outlet through which said purified air is exhausted from said blower unit; and
    means for removable mounting said blower unit to said top rail perimeter.

6. A hamper air purification apparatus according to claim 5 wherein said nozzle is positioned on the bottom of said hamper.

7. A hamper air purification apparatus according to claim 5 wherein said hose is a flexible hose.

8. A hamper according to claim 1 wherein said filter includes activated charcoal.

9. A hamper according to claim 5 wherein said filter includes activated charcoal.

10. A method for removing noxious vapors from a dry cleaning hamper, said method comprising the steps of:
    placing a nozzle proximate to the bottom of said dry cleaning hamper for receiving noxious vapors from said dry cleaning hamper, said nozzle including an inlet, an outlet and a filter located therebetween for entrapping said noxious vapors, said nozzle outlet being connected to the inlet end of a hose wherein the outlet end of said hose is connected to a blower unit; and
    operating said blower unit to draw said noxious vapors into said nozzle inlet wherein purified air exits said nozzle outlet and is drawn through said hose and exhausted by said blower unit.

11. A method for removing noxious vapors from a dry cleaning hamper according to claim 10 wherein said blower unit includes means for removably mounting said blower unit to said dry cleaning hamper.

* * * * *